US010761960B2

(12) United States Patent
Sharma et al.

(10) Patent No.: US 10,761,960 B2
(45) Date of Patent: Sep. 1, 2020

(54) CODE ASSESSMENT PLATFORM

(71) Applicant: Accenture Global Solutions Limited, Dublin (IE)

(72) Inventors: Abhishek Sharma, Jaipur (IN); Kapil Kumar Gupta, Gurgaon (IN); Jayanthi Mohanram, Bangalore (IN); Mani Gupta, Fursungi (IN); Prateek Shah, Birmingham (GB); Rohit Anand, Houston, TX (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/453,709

(22) Filed: Jun. 26, 2019

(65) Prior Publication Data

US 2020/0012582 A1 Jan. 9, 2020

(30) Foreign Application Priority Data

Jul. 5, 2018 (IN) .............................. 201841025149

(51) Int. Cl.
*G06F 9/44* (2018.01)
*G06F 11/36* (2006.01)
*G06Q 10/06* (2012.01)
*G06F 16/21* (2019.01)

(52) U.S. Cl.
CPC ...... *G06F 11/3608* (2013.01); *G06F 11/3692* (2013.01); *G06F 16/214* (2019.01); *G06Q 10/0631* (2013.01)

(58) Field of Classification Search
CPC .............. G06F 11/3608; G06F 16/214; G06F 11/3692; G06Q 10/0631
USPC .................................................. 717/108, 107
See application file for complete search history.

(56) References Cited

U.S. PATENT DOCUMENTS

2011/0283270 A1 11/2011 Gass et al.
2017/0344344 A1 11/2017 Gass et al.
2019/0155715 A1* 5/2019 Khandalkar .............. G06F 8/00

* cited by examiner

*Primary Examiner* — Chuck O Kendall
(74) *Attorney, Agent, or Firm* — Harrity & Harrity, LLP

(57) ABSTRACT

A device may receive, from a user device, a request for a code assessment of a proposed change to an enterprise resource planning (ERP) system of an organization to identify an impact of implementing the proposed change on custom code associated with the ERP system. The device may obtain data identifying custom items associated with the custom code from a data structure associated with the ERP system. The device may generate custom code metadata for the custom items by performing error checks to determine whether the custom items will cause errors after the proposed change is implemented. The device may generate an assessment report for the code assessment by processing the custom code metadata. The device may provide the assessment report for display on an interface of the user device, and may perform actions to permit the proposed change to be implemented without the errors occurring.

20 Claims, 10 Drawing Sheets

CODE ASSESSMENT PLATFORM

RELATED APPLICATION

This application claims priority under 35 U.S.C. § 119 to Indian Patent Application No. 201841025149, filed on Jul. 5, 2018, the content of which is incorporated by reference herein in its entirety.

BACKGROUND

Enterprise resource planning (ERP) is the integrated management of end-to-end processes of an organization. An ERP system may manage the end-to-end process of an organization by utilizing service management tools. The ERP system may include a development environment for creating the service management tools, a quality environment for testing the service management tools, and a production environment for deploying the service management tools.

SUMMARY

According to some possible implementations, a device may include one or more memories, and one or more processors that are communicatively coupled to the one or more memories. The one or more processors may receive, from a user device, a request for a code assessment of a proposed change to an enterprise resource planning (ERP) system of an organization. The code assessment may identify an impact that implementing the proposed change is to have on custom code associated with the ERP system. The proposed change may include at least one of: a first change to migrate organization data of the organization from a first set of databases to a second set of databases or a second change to transform the organization data of the organization to a state that is compatible with the second set of databases. The one or more processors may obtain data identifying a set of custom items associated with the custom code from a data structure associated with the ERP system. The one or more processors may generate custom code metadata for the set of custom items by performing a set of error checks to determine whether the set of custom items will cause errors after the proposed change is implemented. The one or more processors may generate an assessment report for the code assessment by processing the custom code metadata. The assessment report may include assessment data, and the assessment data may include at least one of: a first set of assessment data identifying one or more actions that are capable of being performed to allow the proposed change to be implemented without the errors occurring or a second set of assessment data identifying an estimated time to implement the proposed change without the errors occurring. The one or more processors may provide the assessment report for the code assessment for display on an interface of the user device. The one or more processors may perform the one or more actions to permit the proposed change to be implemented without the errors occurring.

According to some possible implementations, a method may include receiving, by a device and from a user device, a request for a code assessment of a proposed change to an enterprise resource planning (ERP) system of an organization. The code assessment may identify an impact that implementing the proposed change is to have on custom code associated with the ERP system. The proposed change may include at least one of: a first change to migrate organization data of the organization from a first set of databases to a second set of databases or a second change to transform the organization data of the organization to a state that is compatible with the second set of databases. The method may include providing, by the device, a tool to the ERP system to cause the tool to generate custom code metadata for a set of custom items associated with the custom code and to provide the custom code metadata to the device or to a data structure accessible to the device. The tool may generate the custom code metadata by performing a set of error checks to determine whether the set of custom items will cause errors after the proposed change is implemented. The method may include receiving, by the device and from the ERP system or the data structure, the custom code metadata. The method may include generating, by the device, assessment data for the code assessment by processing the custom code metadata. The assessment data may identify one or more actions that are capable of being performed to allow the proposed change to be implemented without the errors occurring. The method may include providing, by the device, the assessment data for the code assessment for display on an interface of the user device. The method may include performing, by the device, the one or more actions to permit the proposed change to be implemented without the errors occurring.

According to some possible implementations, a non-transitory computer-readable medium may store instructions that include one or more instructions that, when executed by one or more processors of a device, cause the one or more processors to receive, from a user device, a request for a code assessment of a proposed change to an enterprise resource planning (ERP) system of an organization. The code assessment may identify an impact that implementing the proposed change is to have on custom code associated with the ERP system. The proposed change may include at least one of: a first change to migrate organization data of the organization from a first set of databases to a second set of databases or a second change to transform the organization data of the organization to a state that is compatible with the second set of databases. The one or more instructions may cause the one or more processors to obtain data identifying a set of custom items associated with the custom code from a data structure associated with the ERP system. The one or more instructions may cause the one or more processors to generate custom code metadata for the set of custom items by performing a set of error checks to determine whether the set of custom items will cause errors after the proposed change is implemented. The one or more instructions may cause the one or more processors to generate assessment data for the code assessment by processing the custom code metadata. The assessment data may identify one or more actions that are capable of being performed to allow the proposed change to be implemented without the errors occurring. The one or more instructions may cause the one or more processors to provide the assessment data for the code assessment for display on an interface of the user device. The one or more instructions may cause the one or more processors to perform the one or more actions to permit the proposed change to be implemented without the errors occurring. The one or more actions may include at least one of: a first action to modify a custom item of the set of custom items, a second action to remove the custom item, or a third action to generate a new custom item.

DETAILED DESCRIPTION

Figure 1A:
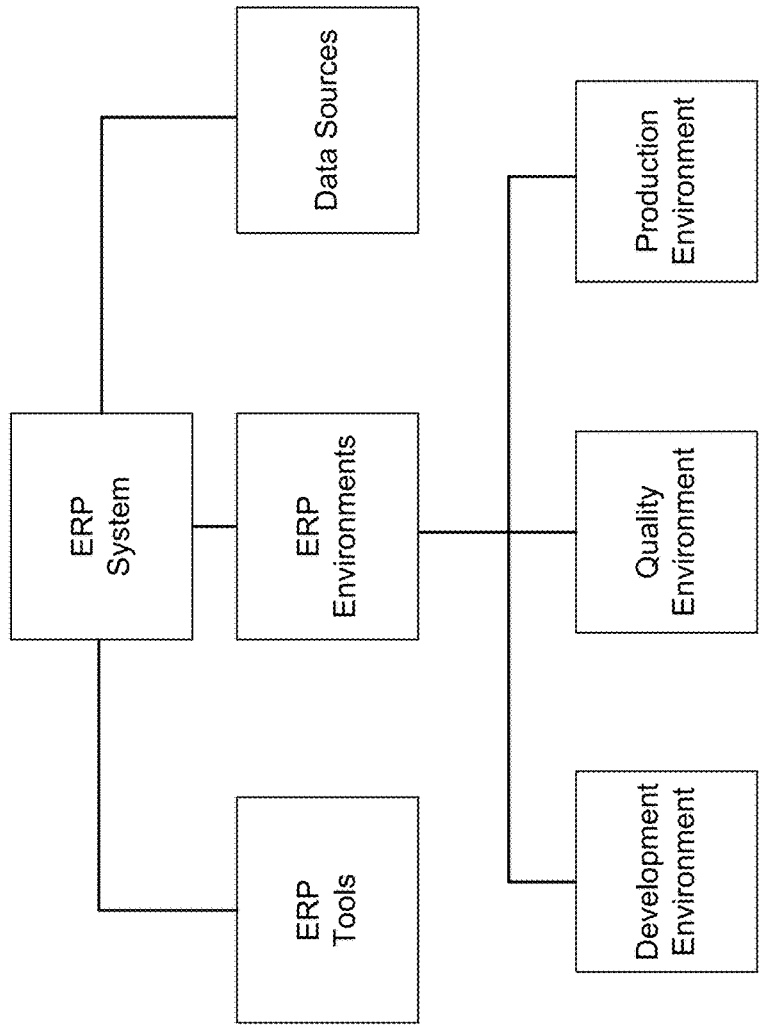
FIGS. 1A-1E are diagrams of an example implementation described herein.

The following detailed description of example implementations refers to the accompanying drawings. The same reference numbers in different drawings may identify the same or similar elements.

Enterprise resource planning (ERP) may refer to the integrated management of end-to-end processes of an organization. An ERP system may manage the end-to-end process of an organization by utilizing service management tools, such as project management tools, information technology (IT) management tools (e.g., database management tools), supply chain management tools, human resources management tools, customer service management tools, and/or the like. The ERP system may include a development environment for creating the service management tools, a quality environment for testing the service management tools, and a production environment for deploying the service management tools.

In some cases, a vendor organization may offer some service management tools to the organization, such that the organization is able to utilize the service management tools immediately upon deploying the ERP system. Over time, the organization may develop custom service management tools that are created to satisfy needs of the organization.

In some cases, a commercial provider of the ERP system may release new enhancements or improvements to the ERP system. For example, the commercial provider may release a new type of database management system that requires the organization to migrate organization data from a set of legacy databases to a new set of databases. In some cases, the organization may need to convert the organization data such that the organization data is in a state that is compatible with the new set of databases.

Additionally, the service management tools of the ERP system may need to be modified to be able to interact with the new set of databases. For example, if a service management tool interacts with a set of legacy databases to perform a read function and/or a write function, the service management tool may need to be modified to be able to interact with a new database of the ERP system.

However, modification of custom service management tools may be difficult given that custom service management tools are created specifically for the organization. For example, the commercial provider of the ERP system may release instructions on how to upgrade the ERP system to utilize the new set of databases, but the instructions may not be able to adequately help the organization with updating the custom service management tools.

Furthermore, the ERP system may expend considerable processing resources and/or network resources trying to update the custom service management tools to be compatible with the new set of databases. For example, the ERP system may expend processing resources and/or network resources to design modified versions of the custom service management tools, to test the modified version of the custom service management tools, to apply error correction procedures to modified custom service management tools that do not execute properly, and/or the like.

Some implementations described herein provide a code assessment platform to assess an impact that a change to an ERP system would have on custom code used to support a set of service management tools of the ERP system, and to perform actions to eliminate or reduce the impact. For example, the code assessment platform may receive, from a user device associated with an organization, a request for a code assessment that is to analyze a proposed change to an ERP system of the organization. The proposed change may be a change to implement a new type of database and may require migrating organization data from legacy databases to new databases and/or converting the organization data to a state that is compatible with the new databases. Furthermore, the code assessment may be used to identify an impact that implementing the proposed change is to have on custom code associated with a set of custom service management tools of the ERP system.

In some implementations, the code assessment platform may generate or receive custom code metadata indicating whether a set of custom items included within the custom code are compatible with the proposed change. For example, the custom code metadata may indicate whether custom programs, custom objects, custom classes, custom functions, and/or the like, will cause errors if executed after the proposed changes are implemented.

In some implementations, the code assessment platform may generate assessment data for the code assessment. For example, the code assessment platform may generate code assessment data identifying one or more actions that may be performed to make the custom code compatible with the new databases. The one or more actions may include actions to modify custom code, actions to create new custom code, actions to remove custom code, actions to combine the custom code with other custom code, and/or the like.

In some implementations, the code assessment platform may provide the code assessment data for display on an interface of the user device. The assessment data may identify the errors, the actions capable of correcting the errors, an estimated time to perform the actions to correct the errors, information indicating whether particular errors may be corrected automatically, and/or the like. In some implementations, the code assessment platform may perform one or more additional actions to permit a proposed change to be implemented without the errors occurring, as described further herein.

In this way, the code assessment platform generates a code assessment that identifies errors and recommends actions that may be performed to ensure that the custom code is compatible with the new databases. Additionally, by providing the organization with a code assessment, the code assessment platform allows the proposed change to be implemented using an efficient and effective use of processing resources and/or network resources. For example, by identifying particular custom code that needs to be modified, added, and/or removed, and by identifying an estimated time to modify, add, and/or remove the particular custom code, the organization is able to allocate a sufficient amount of resources (e.g., processing resources, network resources, human resources, etc.) needed to implement the proposed change.

Furthermore, by automatically performing actions to ensure that the custom code is compatible with the new set of databases, the code assessment platform conserves processing resources and/or network resources that would otherwise be used to manually correct errors caused by the custom code, processing resources and/or network resources that would be used to execute error correction techniques if the manually corrections did not succeed, and/or the like.

FIGS. 1A-1E are diagrams of an example implementation 100 described herein. For example, example implementation 100 may include a user device, a code assessment platform, a collection of data sources (shown in FIG. 1A as Data Sources and in FIGS. 1C-1E as Data Source 1 through Data Source N), and an enterprise resource planning (ERP) system.

As shown in FIG. 1A, and by reference number 105, an organization may utilize an ERP system to generate a set of service management tools. For example, the organization may use the ERP system to generate a set of service management tools that manage end-to-end processes of the organization, such processes relating to procurement, production, distribution, accounting and finance, human resources, corporate performance and governance, custom services, asset management, and/or the like.

In some implementations, the ERP system may include a set of environments for designing, testing, and/or deploying the set of service management tools. For example, the set of environments may include a development environment, a quality environment, and/or a production environment. In some implementations, the development environment may be used to design a new service management tool, upgrade or modify an existing service management tool, and/or the like. For example, a team of developers of the organization may use an integrated development environment (IDE) tool that is part of the development environment for designing the new service management tool.

In some implementations, the quality environment may be used to test the new service management tool, test an upgrade or a modification to the existing service management tool, and/or the like. For example, testers of the organization may use the quality environment to execute a set of test modules to ensure that a particular service management tool is ready for deployment. In some implementations, the production environment may be used to deploy the particular service management tool. For example, the production environment may support real-time application of a set of service management tools, such as the particular service management tool.

In some implementations, the set of service management tools may include project management tools, information technology (IT) management tools, work flow management tools, department-specific tools (e.g., supply chain management tools, transportation management tools, etc.), domain-specific tools (e.g., tools for managing a medical process, a retail process, etc.), and/or the like. For example, the IT management tools may include a database management tool, such as a document management system (DMS), a content management system (CMS), and/or the like. The DMS or the CMS may include one or more server devices that interact with a set of databases to manage the creation and/or modification of text files, audio files, image files, multimedia files, and/or the like.

As another example, the workflow management tools may include a workflow management tool for monitoring a status of a good (e.g., a good may be at a particular point in a production process, may be at a particular location, such as a warehouse or a retail store, may be sold or unsold, may be in good condition or damaged, etc.), a workflow management tool for monitoring permissions relating to data associated with the good (e.g., after a good is delivered to a retail store, a retailer manager of the store may be given permission to edit the good's status), and/or the like.

As another example, the department-specific tools may include a first supply chain management tool for identifying raw materials used to create a product, work-in-process inventory, and/or finished products, a second supply chain management tool for tracking the raw materials, the work-in-process inventory, the finished products, and/or the like. As another example, the department-specific tools may include a first customer relationship management tool for processing customer service requests, a second customer relationship management tool for obtaining and analyzing customer feedback, a third customer relationship management tool for creating improvements to existing custom relationship management processes, and/or the like.

As another example, the domain-specific tools may include a medical tool that manages a patient admission process, a process for servicing a patient, a patient checkout process, and/or the like. As another example, the domain-specific tools may include a retail management tool that manages a process used to unload goods that have arrived at a retail store, a process for displaying the goods at particular locations within the retail store, a process for disposing of perishable goods that are not sold prior to an expiration date, and/or the like.

In some implementations, a service management tool may be provided as part of the ERP system. For example, if the organization purchases rights to use the ERP system from an ERP vendor organization, the ERP system may come provisioned with a collection of generic service management tools that the organization may utilize. As an example, the ERP system may come provisioned with generic service management tools that may be used to manage one or more of the above-mentioned processes (e.g., processes relating to IT management, workflow management, etc.).

In some implementations, the organization may use the ERP system to create custom service management tools. For example, one or more developers of the organization may use the development environment to design custom service management tools, such as custom service management tools relating to IT management, workflow management, management of department-specific processes, management of domain-specific processes, and/or the like.

It is to be understood that the implementations described above are provided merely as illustrative examples. In practice, the set of service management tools may include any tool capable of managing an end-to-end process of the organization, such as by filtering the organization data, aggregating the organization data, sorting the organization data, modifying the organization data, validating the organization data, and/or the like.

In some implementations, the set of service management tools may be deployed in the production environment of the ERP system. Once deployed, the ETL system may use the service management tools to analyze organization data associated with one or more of the above described processes. For example, a service management tool may be deployed to filter, aggregate, sort, modify, and/or validate organization data relating to a particular process, such as transactional data relating IT management, supply chain management, procurement, and/or the like.

In some implementations, the ERP system may use the data sources to store the organization data. In some implementations, the ERP system may process and store large quantities of organization data (e.g., gigabytes of data, terabytes of data, petabytes of data, etc.), such that a human operator may be unable to objectively process and/or create records of the organization data.

In this way, the organization is able to utilize an ERP system to generate service management tools that may be deployed to manage end-to-end processes of the organization.

As shown in FIGS. 1B-1E, the organization may use the code assessment platform to obtain a code assessment that is to identify an impact that a proposed change to the ERP system would have on a set of custom service management tools of the ERP system.

Figure 1B:
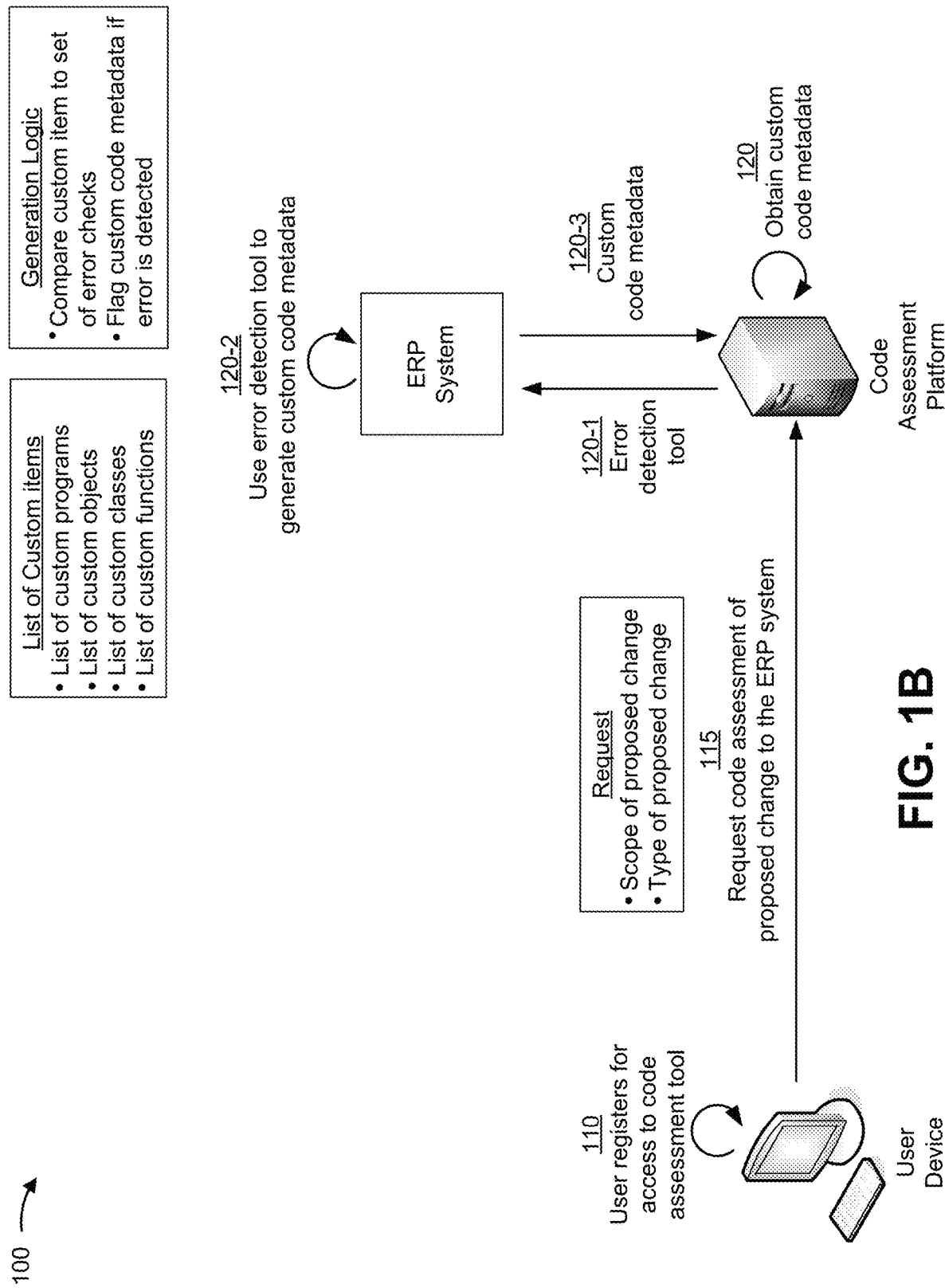

As shown in FIG. 1B, and by reference number 110, a user associated with the organization may register for access to a code assessment tool. For example, the user (e.g., an employee) of the organization may interact with a registration portion of a web interface of the code assessment tool to register for access to the code assessment tool. In this case, the user may create a user profile, a username and password, and/or the like. The user profile may indicate a name of the organization, a name of a group or division within the organization (e.g., that the user works within), a name of the user, contact information for the user, and/or the like.

As shown by reference number 115, the user device may provide, to the code assessment platform, a request for the code assessment of the proposed change to the ERP system of the organization. For example, the user may log in to the code assessment tool and may submit a request for a code assessment. The request may include data identifying a scope of the proposed change (e.g., the entire ETL system, a particular environment within the ETL system, etc.) and/or data identifying the proposed change. The proposed change may be a change to upgrade to a new type of database (e.g., which may require migration of the organization data to a new type of database, conversion of the organization data to the new type database, etc.), a change to use a new type of cloud service provider, a change to use a new operating system to support one or more devices of the ERP system, and/or the like.

In some implementations, the proposed change may be a change to upgrade to a new type of database. For example, the ERP system may store the organization data using a first set of databases, and implementing the proposed change would require replacing the first set of databases with a new set of databases. In this case, the proposed change may require migrating the organization data from the first set of databases to the new set of databases. In some cases, the proposed change may also require converting the organization data to a state that is compatible with the new set of databases.

As an example, the request for the proposed change may be a request for a code assessment for a change from a first set of databases to a new set of databases, where the first set of databases use column-based data storage and in-memory computing (e.g., a HANA database). The new set of databases may be supported using column-based data storage, in-memory computing capabilities, and a simplified data model (e.g., an S4 HANA database). To update the ERP system to support the new set of databases, a server device associated with the ERP system may need to filter, reduce, modify, and/or eliminate some of the organization data, such that the organization data is able to be stored by the simplified data model of the new set of databases.

By using in-memory computing, the new type of ERP data storage system may store the organization data using main memory (e.g., rather than disk storage), which may improve a rate at which the organization data may be queried from the new set of databases, increase scalability, enable real-time data analytics, and/or the like. Additionally, using the simplified data model reduces or eliminates data types, data structures, databases, and/or the like, which further improves overall database performance.

As another example, the request for the proposed change may be a request for a code assessment for a change from a first set of databases to a new set of databases, where the first set of databases use a different type of storage logic (e.g., row-based data storage) and do not utilize in-memory computing (e.g., data may be stored using random access memory (RAM)). The new set of databases may be supported using column-based data storage, in-memory computing capabilities, and a simplified data model (e.g., an S4 HANA database). To update the ERP system to support the new set of databases, in addition to filtering, reducing, modifying, and/or eliminating some of the organization data, the proposed change my also require accounting for changes to the data storage logic. For example, to move from row-based data storage to column-based data storage, the organization data may need to be sorted, re-tagged, filtered, and/or the like.

In some implementations, the request for the proposed change may be a request for a code assessment for a change to a new type of cloud service provider, a change to use a new operating system to support one or more devices of the ERP system, and/or the like. In some cases, if the request is for a proposed change to a new type of database, implementing the proposed change may also require a change to the cloud service provider, to one or more operating systems, and/or the like, to satisfy minimum system requirements needed to efficiently and effectively interact with the new type of database.

As shown by reference number 120, the code assessment platform may obtain custom code metadata that may be used to perform the code assessment. For example, the code assessment platform may obtain custom code metadata for custom code that is used to execute the set of custom service management tools. The custom code may include a set of custom programs, a set of custom objects, a set of custom classes, a set of custom functions, and/or any other customized software that the organization is using to supplement built-in service management tools of the ERP system.

The custom code metadata may identify an impact that the proposed change will have on the custom code. For example, the custom code may include metadata identifying a particular custom item, metadata identifying a type of error that the particular custom item will cause if executed after the proposed change is implemented, metadata identifying one or more additional custom items that are to be impacted by the error, metadata identifying one or more databases that are to be impacted by the error, and/or the like. The metadata identifying the type of error may include metadata identifying a syntax error, metadata identifying a functional error, metadata identifying a performance error, metadata identifying a simplification error, metadata identifying an optimization error, and/or the like.

In some implementations, as shown by reference number 120-1, 120-2, and 120-3, the code assessment platform may obtain the custom code metadata without having access to the organization data and/or the custom code associated with the custom service management tools. For example, as shown by reference number 120-1, the code assessment platform may provide the ERP system with an error detection tool that is capable of self-executing to analyze the set of custom items and to generate the custom code metadata.

As shown by reference number 120-2, the ERP system may use the error detection tool to generate the custom code metadata. For example, the ERP system may execute the error detection tool, which may scan a data structure that includes the list of custom items. In this case, the ERP system may use the error detection tool to perform a set of error checks on the set of custom items. Additionally, the ERP system may generate, for each custom item, custom code metadata identifying whether the custom item will cause an error, a type of error that will be caused by execution of the custom item, a location of the custom item (e.g., a custom function or a custom class may be part of a particular program, may be part of multiple programs, etc.), and/or the like.

The set of error checks may include a first error check identifying a first custom item that interacts with a database that is not supported as part of the new set of databases, a second error check identifying a second custom item that includes syntax that is not compatible with the new set of databases, a third error check identifying a third custom item for interacting with the new set of databases but that is not included in the set of custom items, a fourth error check identifying a fourth custom item that causes a simplification error, a fifth error check identifying that the set of custom items do not include a feature for improving efficiency of interactions within the new set of databases, and/or the like.

As an example, the ERP system may use the error detection tool to identify that a first custom item interacts with a database that is not supported as part of the new set of databases. In this example, the simplified data model used by the new set of databases may require eliminating one or more databases that were part of the first set of databases. As such, if the first custom item were to interact with the database (e.g., by attempting to read data from the database or write data to the database), the first custom item would cause a run-time error to occur because the first custom item would attempt to access a database that is not included in the new set of databases.

As another example, the ERP system may use the error detection tool to identify that a second custom item includes syntax that is not compatible with the new set of databases. In this example, the syntax error may be due to the new set of databases needing to be queried using a different programming language, using the same programming language but different logical expressions and/or variables, and/or the like. As such, if the second custom item were to interact with the new set of databases, the second custom item would cause a compiler error due to the incorrect syntax.

As another example, the ERP system may use the error detection tool to identify that a third custom item is needed to interact with the new set of databases but is not included in the set of custom items. In this example, the ERM system may scan the list of custom items to determine that the third custom item is not included in the list of custom items. As such, if the proposed change was to be implemented, an error (e.g., a compiler error, a functional error, etc.) may prevent a custom service management tool from providing a particular service.

As another example, the ERP system may use the error detection tool to identify that the set of custom items do not include a feature that improves efficiency of interactions with the new set of databases. In this example, the ERP system may analyze a list of capabilities of the new set of databases to identify a feature for improving data storage efficiency (e.g., the feature may use an optimization technique to reduce an amount of unnecessary data that is provided to the new set of databases). Additionally, the ERP system may analyze the set of custom items to determine that the set of custom items do not provide the feature needed to improve data storage efficiency. As such, if the proposed change was to be implemented, the ERP system would not reduce utilization of processing resources, network resources, and/or storage resources by taking advantage of the feature.

In some cases, the ERP system may identify multiple errors for a particular custom item. For example, two or more of the above described errors may be identified for a particular custom item.

As shown by reference number 120-3, the ERP system may provide the custom code metadata to the code assessment platform. By obtaining the custom code metadata without accessing the organization data and/or the custom code used to execute the set of custom service management tools, the code assessment platform is able to generate the code assessment without requiring the organization to give up access to the organization data and/or the custom code. This may be useful in situations where the code assessment platform is controlled by a third-party organization (e.g., a vendor organization providing a code assessment to the organization as a service), as some of the organization data and/or custom code may be intellectual property that the organization would not want to reveal to the vendor organization. Furthermore, obtaining the custom code metadata without accessing the organization data and/or the custom code of the organization improves security by reducing chances of the organization data and/or the custom code being intercepted by an unauthorized party.

In some implementations, the code assessment platform may generate the custom code metadata. For example, the code assessment platform may obtain permission to access the organization data and/or the custom code of the organization. In this case, the code assessment platform may generate the custom metadata by analyzing the set of custom items using the error detection tool, as described above.

In this way, the code assessment platform is able to obtain or generate custom code metadata that may be used to generate the code assessment, as described further herein.

Figure 1C:
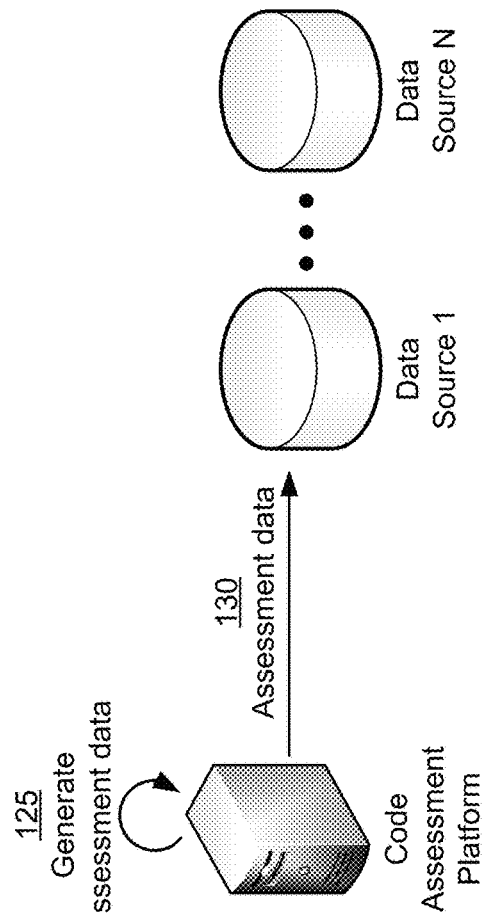

As shown in FIG. 1C, and by reference number 125, the code assessment platform may generate assessment data for the code assessment. For example, the code assessment platform may generate assessment data by processing the custom code metadata using a set of error correction rules, using a data model that has been trained on historical data, and/or the like.

The assessment data may include assessment data identifying one or more actions that are capable of being performed to correct the errors identified by the custom code metadata (e.g., automated actions, manual actions, etc.), assessment data identifying an estimated time to perform the actions and/or to implement the proposed change, and/or the like. The one or more actions may include a first action to modify custom code (e.g., by modifying syntax of a custom item, by modifying one or more statements or lines of code that are part of the custom item, by modifying a structure of the custom item, etc.), a second action to remove a portion of the custom code (e.g., by removing the custom item), a third action to generate new custom code, a fourth action to combine a portion of the custom code with other custom code (e.g., by combining a first custom item with a second custom item), and/or the like.

In some implementations, the code assessment platform may generate assessment data using the set of error correction rules. For example, the code assessment platform may be configured with error correction rules that identify actions that may be performed to correct the errors identified by the custom code metadata. The set of error correction rules may be based on historical data (e.g., past actions used to correct errors), user configured settings, one or more threshold indicators, and/or the like.

As an example, the code assessment platform may generate assessment data indicating that a functional error associated with a custom item may be corrected by modifying the custom item. To provide a specific example, if the functional error would be caused by the custom item executing and attempting to query a database that is not supported as part of the new set of databases, the code assessment platform may generate assessment data indicating that the functional error may be corrected by modifying the custom item, such that the modified custom item is able to query the new set of databases.

As another example, the code assessment platform may generate assessment data indicating that a syntax error associated with a custom item may be corrected by modifying a first syntax of the custom item to a second syntax that is compatible with the new set of databases. As another example, the code assessment platform may generate assessment data indicating that a custom item has to be completely removed and replaced with new custom code that is compatible with the new set of databases.

In some implementations, the code assessment platform may generate the assessment data using a data model. For example, the code assessment platform may train a data model on historical data, such that the data model is able to output values indicating likelihoods of particular actions correcting particular errors. The historical data may include historical assessment data, historical data indicating a level of effectiveness of historical actions that were performed, and/or the like.

Additionally, the code assessment platform may provide the custom code metadata as input to the data model to cause the data model to output a set of values indicating likelihoods of particular actions correcting particular errors. In this case, the code assessment platform may select a particular action that is associated with a value that satisfies a threshold chance of correcting a particular error and may generate assessment data identifying the particular action.

In some implementations, the code assessment platform may generate assessment data indicating whether the actions may be performed automatically. For example, the code assessment platform may generate assessment data indicating that an action to replace old syntax with new syntax that is compatible with the new set of databases is capable of being performed automatically. Conversely, the code assessment platform may generate assessment data indicating that an action to design an entire new custom program is not able to be performed automatically.

In some implementations, the code assessment platform may generate assessment data identifying an estimated time to perform an action. For example, if an action is to modify custom code, the code assessment platform may be configured with an estimated time to design the modified custom code, to create the modified custom code, to test the modified custom code, to deploy the modified custom code when implementing the proposed change, and/or the like.

As shown by reference number 130, the code assessment platform may provide the assessment data to the collection of data sources.

In this way, the code assessment platform generates assessment data that may be used to determine an amount of work that would be needed to implement the proposed change and/or to identify prospective errors that may be automatically corrected.

Figure 1D:
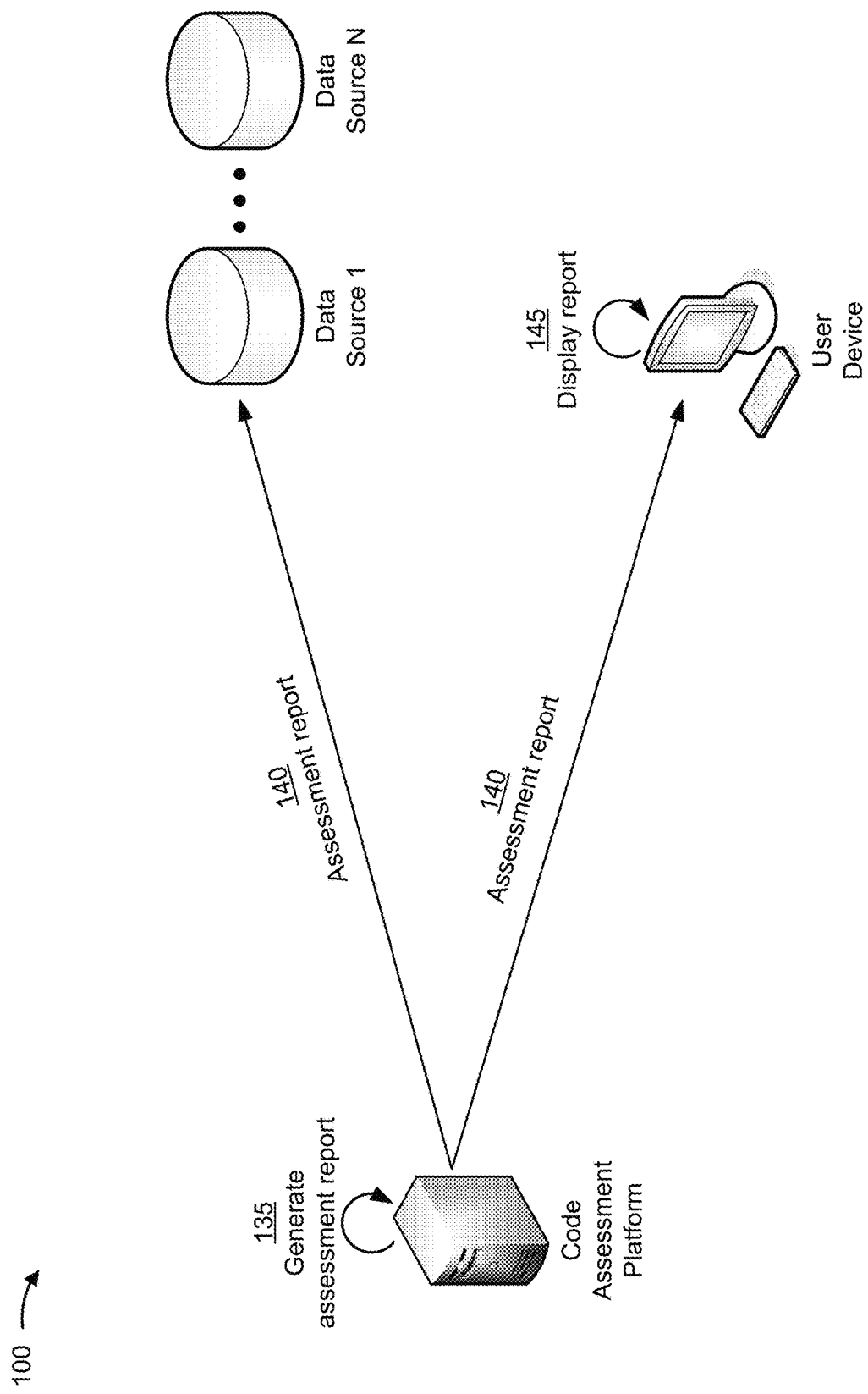

As shown in FIG. 1D, and by reference number 135, the code assessment platform may generate an assessment report that includes the assessment data. For example, the code assessment platform may generate an assessment report that includes the assessment data and/or that includes summary metrics associated with the assessment data. The summary metrics may identify averages or totals, such as a total or an average estimated time to correct the errors, a total or average degree of complexity of correcting the errors, and/or the like.

As shown by reference number 140, the code assessment platform may provide the assessment report to the collection of data sources and/or to the user device. As shown by reference number 145, the user device may display the assessment report, such that an employee of the organization may view the assessment report and use the assessment data and/or the summary metrics to make scheduling decisions relating to implementing the proposed change (e.g., the employee may use the summary metrics to determine how many resources to allocate to implement the proposed change, etc.).

In this way, the code assessment platform is able to generate and provide the assessment report for display on an interface of the user device.

Figure 1E:
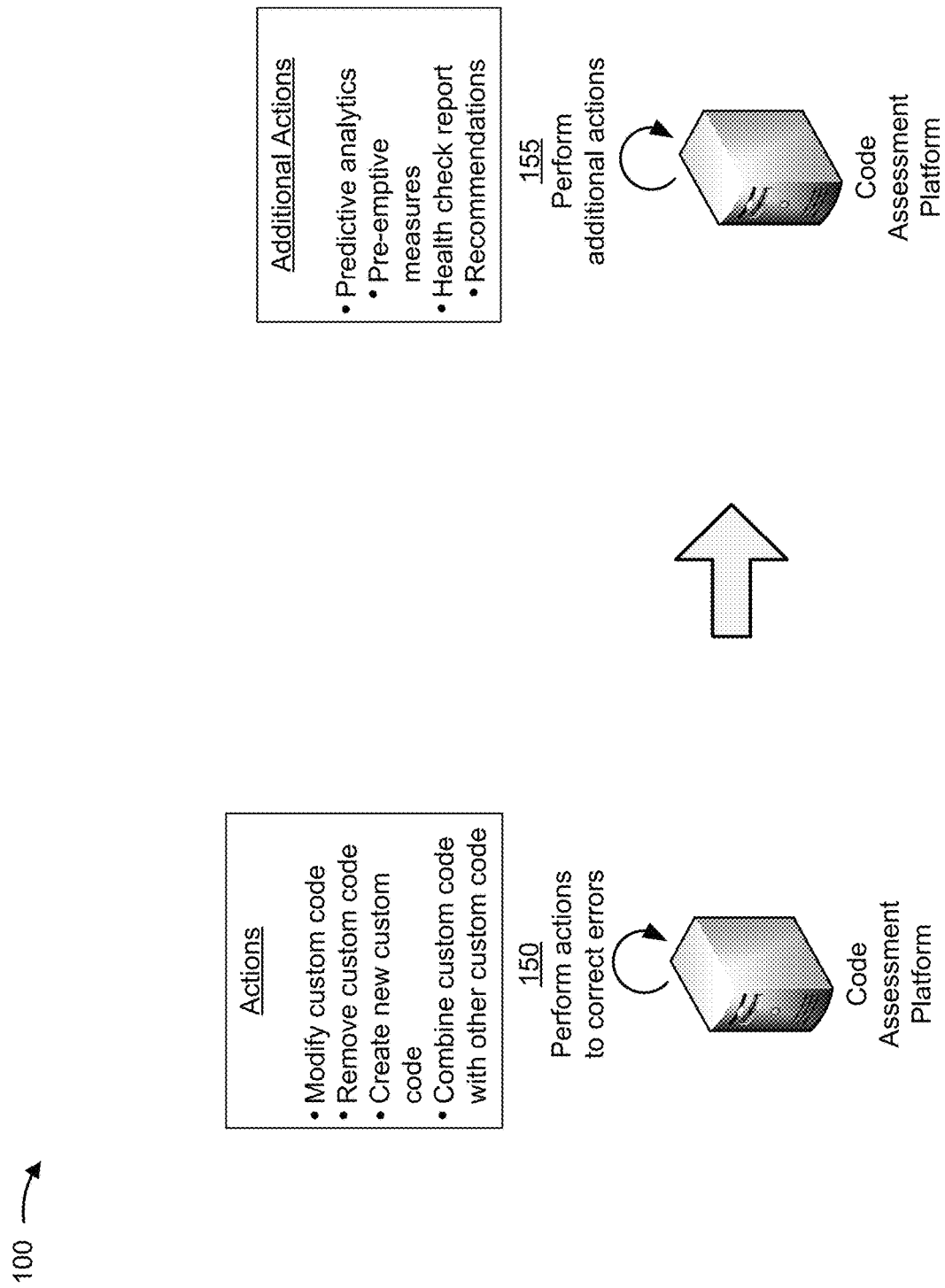

As shown in FIG. 1E, and by reference number 150, the code assessment platform may perform one or more actions to correct errors identified by the custom code metadata. The one or more actions, as described elsewhere herein, may include a first action to modify particular custom code, a second action to remove the particular custom code, a third action to create new custom code, a fourth action to combine the particular custom code with other custom code, and/or the like.

As an example, the code assessment platform may automatically modify particular custom code. In this example, the code assessment platform may identify a location of the particular custom code that is to be modified (e.g., which may be provided by the custom code metadata). Additionally, the code assessment platform may obtain or be configured with replacement code that is to be used for the modification. For example, the code assessment platform may be configured with replacement code that is capable of eliminating the error, such as replacement code in a syntax that is compatible with the new set of databases, replacement code that may allow a particular service management tool to interact with the new set of databases (e.g., to read organization data from and/or write organization data to the new set of databases), and/or the like.

In some cases, the code assessment platform may dynamically generate replacement code. For example, the code assessment platform may be configured with a rule that allows the code assessment platform to convert the particular custom code from a first syntax to a second syntax, and the code assessment platform may use the rule to generate the replacement code.

In some implementations, the code assessment platform may replace the particular custom code with the replacement custom code. For example, the code assessment platform may interact with the development environment of the ERP system (e.g., using an application programming interface (API) and/or login credentials provided by the organization) to replace the particular custom code with the replacement custom code, which may allow the proposed change to be implemented without human intervention. The code assessment platform may follow a similar process for removing particular custom code, for creating new custom code, and/or for combining the particular custom code with other custom code.

As another example, the code assessment platform may generate and provide instructions for another device to modify the particular custom code. In this example, the code assessment platform may generate instructions on how to modify the particular custom code, which may indicate a location of the particular custom code, a location of pre-made replacement code or instructions on how to generate replacement code, and/or the like.

By performing one or more actions, the code assessment platform reduces or eliminates errors that need to be corrected to allow the proposed change to be implemented. This conserves processing resources and/or network resources that would otherwise be used to unsuccessfully execute particular custom service management tools after the proposed change is implemented, processing resources and/or network resources that would be used to perform error correction techniques after one or more errors occurred during deployment of the particular custom service management tools, and/or the like.

As shown by reference number 155, the code assessment platform may perform one or more additional actions. For example, the code assessment platform may generate and provide predictive analytics data to the user device. In this case, the code assessment platform may generate predictive analytics data by analyzing the assessment data and historical data associated with the organization.

The predictive analytics data may indicate an impact that implementing the proposed change would have on a class associated with the organization, such as a first class of customers of the organization, a second class of employees of the organization, a third class of a particular group within the organization, and/or the like. The impact may describe which class is to be impacted by the proposed change, a degree to which the proposed change is to impact the class (e.g., will the proposed change prevent a service from being provided to an end customer, delay a service from being provided to the end customer, enable a new service to be provided to the end customer, etc.), and/or the like. Additionally, the code assessment platform may provide the predictive analytics data to one or more devices associated with the organization.

In some implementations, the code assessment platform may use the predictive analytics data to perform additional actions. For example, the code assessment platform may generate predictive analytics data indicating that a particular department within the organization is likely to have processes that are impacted when the proposed change is implemented. In this case, the code assessment platform may provide a notification to a manager of the particular department indicating issues may arise while the proposed change is being implemented, which may allow the manager to take pre-emptive measures needed to mitigate the issues that may arise.

In some cases, the code assessment platform may automatically perform the pre-emptive measures. For example, if a particular department uses a large number of custom service management tools to perform particular processes, and the errors are unable to be corrected before the proposed change is implemented, the code assessment platform may make scheduling decisions to optimize resources of the organization. As an example, if the proposed change is to be implemented between 2 AM and 9 AM, but issues are expected to delay the availability of the custom service management tools, the code assessment platform may modify schedules of one or more employees that are to interact with the custom service management tools (e.g., by alerting the employees to work from 1 PM to 9 PM instead of from 9 AM to 5 PM). In this way, the code assessment platform uses the predictive analytics data to optimize resources of the organization.

As another example, the code assessment platform may generate and provide a health check report to the user device. The health check report may indicate a degree of complexity of the custom code of the organization relative to the one or more other organizations. For example, the code assessment platform may compare the assessment data and additional assessment data associated with one or more other organizations that have previously implemented the proposed change.

In this case, the code assessment platform may identify a degree of complexity of implementing the proposed change based on a number of errors associated with the custom code relative to a number of errors associated with the custom code of the one or more other organizations, based on an estimated time to correct the errors associated with the custom code relative to an actual time taken to correct the errors associated with the custom code of the one or more other organizations, and/or the like. Additionally, the code assessment platform may provide the health check report for display on an interface of the user device. By generating the health check report, the code assessment allows the organization to see whether the amount of time and effort invested in implementing the proposed change aligns with time and effort invested by other organizations in the same industry.

In some implementations, the code assessment platform may generate one or more recommendations based on information included in the health check report. For example, the code assessment platform may generate a recommendation indicating ways to improve scalability of the ERP system, such as switching to a new cloud service provider, utilizing one or more different hardware devices and/or software elements as part of the ERP system, replacing an operating system that supports one or more devices of the ERP system, and/or the like. In some cases, the code assessment platform may automatically perform an action based on a recommendation.

In this way, the code assessment platform generates a code assessment that identifies errors and recommends actions that may be performed to ensure that the custom code is compatible with the proposed change. Furthermore, by automatically performing actions to ensure that the custom code is compatible with the new set of databases, the code assessment platform conserves processing resources and/or network resources that would otherwise be used to manually correct errors caused by the custom code, processing resources and/or network resources that would be used to execute error correction techniques if the manually corrections did not succeed, and/or the like.

As indicated above, FIGS. 1A-1E are provided merely as an example. Other examples are possible and may differ from what was described with regard to FIGS. 1A-1E. For example, there may be additional devices and/or networks, fewer devices and/or networks, different devices and/or networks, or differently arranged devices and/or networks than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) of example implementations 100 may perform one or more functions described as being performed by another set of devices of example implementations 100. As an example, while implementations described herein include a code assessment platform that is separate from the ERP system, it is to be understood that in some implementations, the code assessment platform may be implemented as part of the ERP system.

Figure 2:
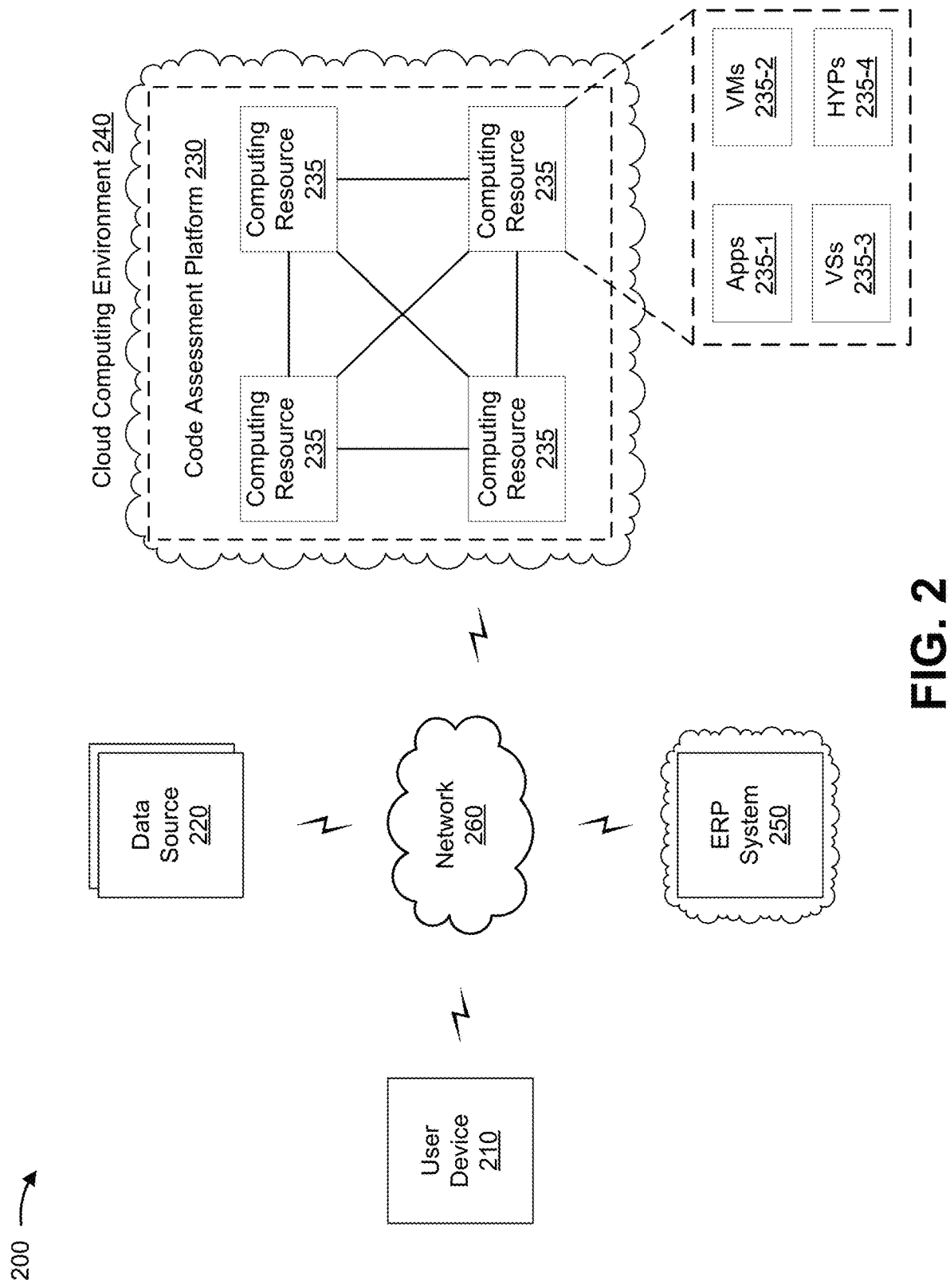
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a data source 220, a code assessment platform 230 hosted within a cloud computing environment 240, an ERP system 250, and/or a network 260. Devices of environment 200 may interconnect via wired connections, wireless connections, or a combination of wired and wireless connections.

User device 210 includes one or more devices capable of receiving, generating, storing, processing, and/or providing information associated with a code assessment. For example, user device 210 may include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 210 may provide, to code assessment platform 230, a request for a code assessment (e.g., of a proposed change to ERP system 250). In some implementations, user device 210 may receive an assessment report (and/or assessment data) from code assessment platform 230.

Data source 220 includes one or more devices capable of receiving, storing, generating, determining, and/or providing information associated with ERP system 250. For example, data source 220 may include a server device or a group of server devices. In some implementations, data source 220 may receive assessment data from code assessment platform 230. In some implementations, data source 220 may receive an assessment report (and/or assessment data) from code assessment platform 230. In some implementations, data source 220 may receive predictive analytics data from code assessment platform 230.

Code assessment platform 230 includes one or more devices capable of receiving, storing, generating, determining, and/or providing information associated with a code assessment. For example, code assessment platform 230 may include a server device (e.g., a host server, a web server, an application server, etc.), a data center device, or a similar device.

In some implementations, code assessment platform 230 may be configured with a code assessment program that is accessible to user device 210 and/or ERP system 250 via a communication interface (e.g., a web interface, via an application programming interface (API), etc.). In some implementations, code assessment platform 230 may interact with ERP system 250 to obtain custom code metadata. In some implementations, code assessment platform 230 may provide a health check report to user device 210. In some implementations, code assessment platform 230 may interact with ERP system 250 and/or one or more other devices associated with the organization to automatically correct errors associated with the custom code. In some implementations, code assessment platform may interact with ERP system 250 and/or one or more other devices associated with the organization to automatically perform actions associated with implementing the requested change. In some implementations, code assessment platform 230 may part of ERP system 250.

In some implementations, as shown, code assessment platform 230 may be hosted in cloud computing environment 240. Notably, while implementations described herein describe code assessment platform 230 as being hosted in cloud computing environment 240, in some implementations, code assessment platform 230 may not be cloud-based (i.e., may be implemented outside of a cloud computing environment) or may be partially cloud-based.

Cloud computing environment 240 includes an environment that hosts code assessment platform 230. Cloud computing environment 240 may provide computation, software, data access, storage, etc. services that do not require end-user knowledge of a physical location and configuration of system(s) and/or device(s) that hosts code assessment platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host code assessment platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by user device 210. Application 235-1 may eliminate a need to install and execute the software applications on these devices. For example, application 235-1 may include software associated with code assessment platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., user device 210), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

ERP system 250 includes one or more devices capable of receiving, storing, generating, determining, and/or providing information associated with an ERP system. For example, ERP system 250 may include a server device or a group of server devices. In some implementations, ERP system 250 may be a Systems Applications and products (SAP) ERP system or a similar type of ERP system. In some implementations, ERP system 250 may include one or more systems and/or processes for supporting a development environment, a quality environment, and/or a production environment. In some implementations, ERP system 250 may interact with code assessment platform 230 and/or another device to automatically modify custom code associated with one or more custom service management tools of ERP system 250.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
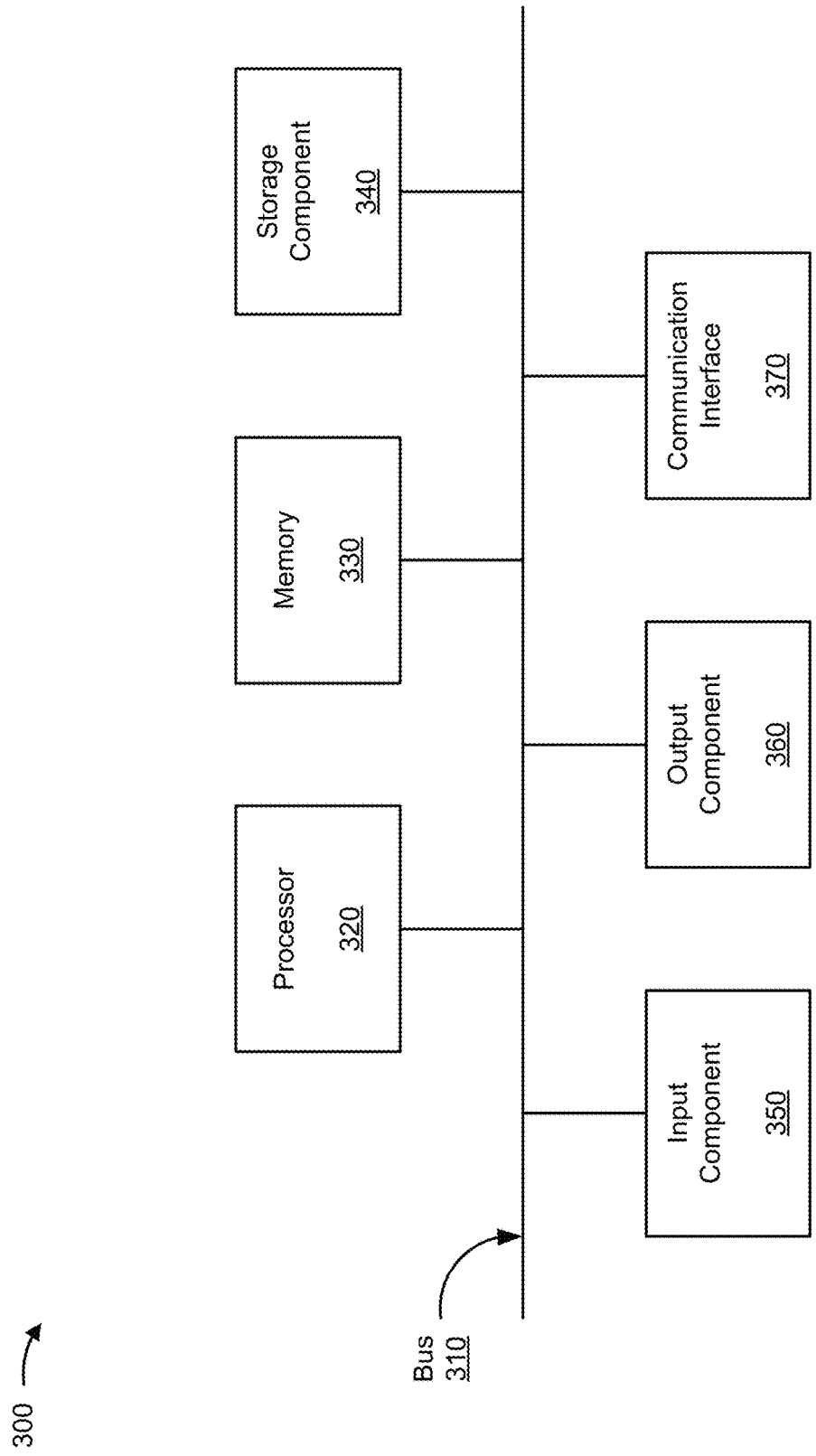
FIG. 3 is a diagram of example components of one or more devices of FIG. 2.

FIG. 3 is a diagram of example components of a device 300. Device 300 may correspond to user device 210, data source 220, code assessment platform 230, and/or ERP system 250. In some implementations, user device 210, data source 220, code assessment platform 230, and/or ERP system 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
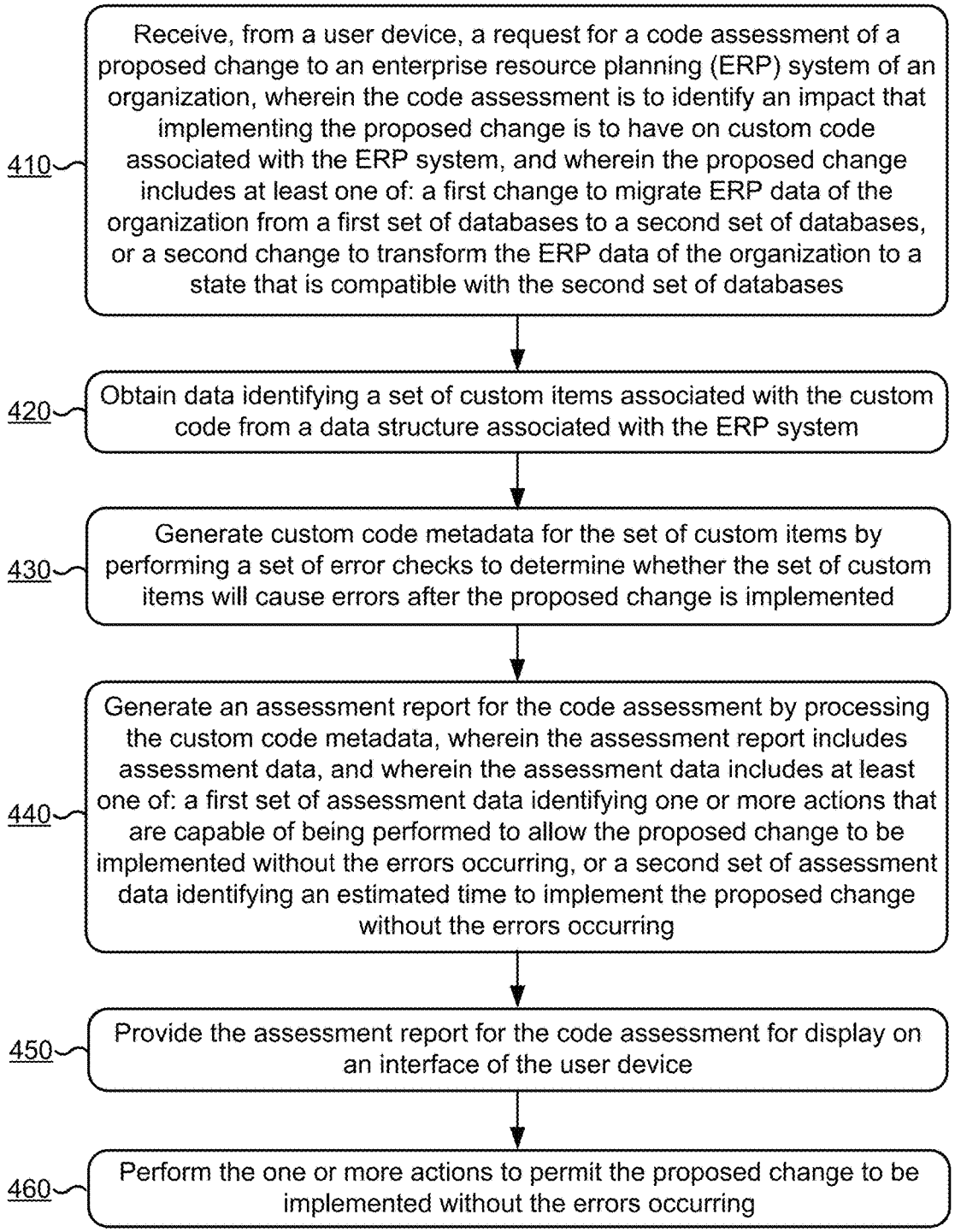
FIGS. 4-6 are flow charts of example processes for assessing an impact that a change to an enterprise resource planning (ERP) system would have on custom code used to support one or more service management tools of the ERP system and performing actions to eliminate or reduce the impact.

FIG. 4 is a flow chart of an example process 400 for assessing an impact that a change to an enterprise resource planning (ERP) system would have on custom code used to support one or more service management tools of the ERP system and performing actions to eliminate or reduce the impact. In some implementations, one or more process blocks of FIG. 4 may be performed by a code assessment platform (e.g., code assessment platform 230). In some implementations, one or more process blocks of FIG. 4 may be performed by another device or a group of devices separate from or including the code assessment platform, such as a user device (e.g., user device 210), a data source (e.g., data source 220), and/or an ERP system (e.g., ERP system 250).

As shown in FIG. 4, process 400 may include receiving, from a user device, a request for a code assessment of a proposed change to an enterprise resource planning (ERP) system of an organization, wherein the code assessment is to identify an impact that implementing the proposed change is to have on custom code associated with the ERP system, wherein the proposed change includes at least one of: a first change to migrate organization data of the organization from a first set of databases to a second set of databases, or a second change to transform the organization data of the organization to a state that is compatible with the second set of databases (block 410). For example, the code assessment platform (e.g., code assessment platform 230, using computing resource 235, processor 320, memory 330, input component 350, communication interface 370, etc.) may receive, from the user device (e.g., user device 210), a request for a code assessment of a proposed change to an enterprise resource planning (ERP) system of an organization, as described above with regard to FIGS. 1A-1E. In some implementations, the code assessment may identify an impact that implementing the proposed change is to have on custom code associated with the ERP system. In some implementations, the proposed change may include at least one of: a first change to migrate organization data of the organization from a first set of databases to a second set of databases, or a second change to transform the organization data of the organization to a state that is compatible with the second set of databases.

In some implementations, the code assessment platform may identify an impact that implementing the proposed change is to have on custom code associated with the ERP system. In some implementations, the proposed change may include at least one of: a first change to migrate organization data of the organization from a first set of databases to a second set of databases, or a second change to transform the organization data of the organization to a state that is compatible with the second set of databases.

As further shown in FIG. 4, process 400 may include obtaining data identifying a set of custom items associated with the custom code from a data structure associated with the ERP system (block 420). For example, the code assessment platform (e.g., code assessment platform 230, using computing resource 235, processor 320, memory 330, input component 350, communication interface 370, etc.) may obtain data identifying a set of custom items associated with the custom code from a data structure associated with the ERP system, as described above in connection with FIGS. 1A-1E.

As further shown in FIG. 4, process 400 may include generating custom code metadata for the set of custom items by performing a set of error checks to determine whether the set of custom items will cause errors after the proposed change is implemented (block 430). For example, the code assessment platform (e.g., code assessment platform 230, using computing resource 235, processor 320, memory 330, etc.) may generate custom code metadata for the set of custom items by performing a set of error checks to determine whether the set of custom items will cause errors after the proposed change is implemented, as described above in connection with FIGS. 1A-1E.

As further shown in FIG. 4, process 400 may include generating an assessment report for the code assessment by processing the custom code metadata, wherein the assessment report includes assessment data, and wherein the assessment data includes at least one of a first set of assessment data identifying one or more actions that are capable of being performed to allow the proposed change to be implemented without the errors occurring, or a second set of assessment data identifying an estimated time to implement the proposed change without the errors occurring (block 440). For example, the code assessment platform (e.g., code assessment platform 230, using computing resource 235, processor 320, memory 330, etc.) may generate an assessment report for the code assessment by processing the custom code metadata, as described above in connection with FIGS. 1A-1E.

In some implementations, the assessment report may include assessment data. In some implementations, the assessment data may include a first set of assessment data identifying one or more actions that are capable of being performed to allow the proposed change to be implemented without the errors occurring and/or a second set of assessment data identifying an estimated time to implement the proposed change without the errors occurring.

As further shown in FIG. 4, process 400 may include providing the assessment report for the code assessment for display on an interface of the user device (block 450). For example, the code assessment platform (e.g., code assessment platform 230, using computing resource 235, processor 320, memory 330, output component 360, communication interface 370, etc.) may provide the assessment report for the code assessment for display on an interface of the user device, as described above in connection with FIGS. 1A-1E.

As further shown in FIG. 4, process 400 may include performing the one or more actions to permit the proposed change to be implemented without the errors occurring (block 460). For example, the code assessment platform (e.g., code assessment platform 230, using computing resource 235, processor 320, input component 350, memory 330, output component 360, communication interface 370, etc.) may perform the one or more actions to permit the proposed change to be implemented without the errors occurring, as described above in connection with FIGS. 1A-1E.

Process 400 may include additional implementations, such as any single implementation or any combination of implementations described below and/or in connection with one or more other processes described elsewhere herein.

In some implementations, the proposed change may include the second change. In some implementations, the second set of databases may utilize in-memory storage capabilities. In some implementations, transforming the organization data to the state that is compatible with the second set of databases may include removing or simplifying a portion of the organization data.

In some implementations, the custom code metadata may include at least one of: metadata identifying a syntax error, metadata identifying a semantic error, metadata identifying a functional error, metadata identifying a performance error, metadata identifying a simplification error, and/or metadata identifying an optimization error.

In some implementations, the code assessment platform may obtain system requirements data associated with a group of devices that are part of the ERP system, and may process the system requirements data to determine that system requirements for a particular device, of the group of devices, does not satisfy minimum system requirements for interacting with the second set of databases. In some implementations, when performing the one or more actions, the code assessment platform may perform a particular action to ensure that the system requirements of the particular device satisfy the minimum system requirements for interacting with the second set of databases In some implementations, the set of error checks may include at least one of: a first error check identifying a first custom item, of the set of custom items, that interacts with a database, of the first set of databases, that is not utilized by the second set of databases, a second error check identifying a second custom item, of the set of custom items, that includes syntax that is not compatible with the second set of databases, and/or a third error check identifying a third custom item that is needed for interacting with the second set of databases but that is not included in the set of custom items.

In some implementations, when generating the assessment report, the code assessment platform may provide the custom code metadata as input to a data model that has been trained on historical assessment data to cause the data model to output a set of values indicating likelihoods of particular actions correcting particular errors. In some implementations, the code assessment platform may determine that a value, of the set of values, satisfies a threshold confidence level. In some implementations, the code assessment platform may generate, as part of the first set of assessment data of the assessment report, data identifying a particular action that is associated with the value.

In some implementations, the code assessment platform may generate, as part of the first set of assessment data, data identifying an automated solution to a particular error. In some implementations, the automated solution may modify a custom item of the set of custom items. In some implementations, when performing the one or more actions, the code assessment platform may modify the custom item to allow the proposed change to be implemented without the custom item causing an error during execution.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
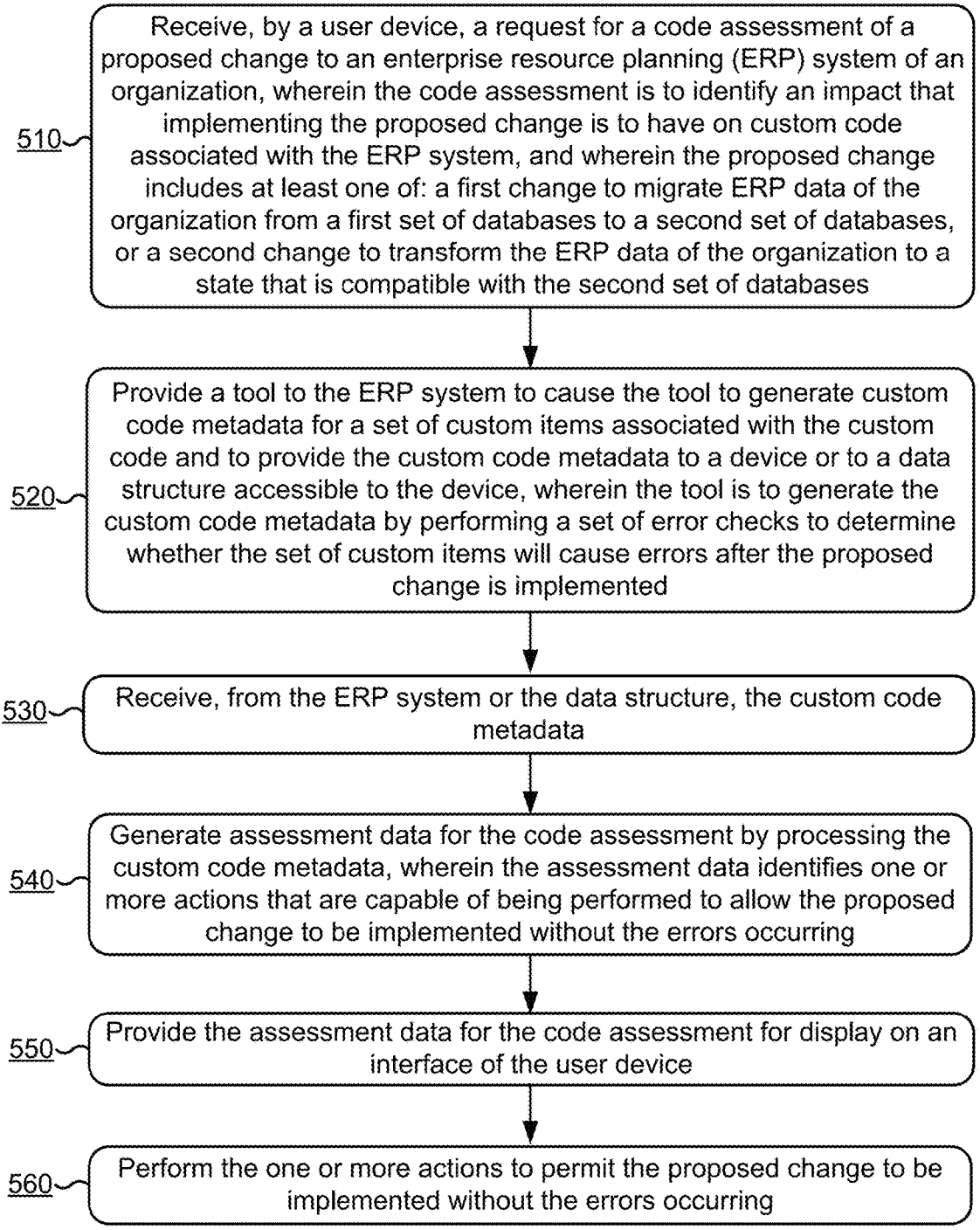

FIG. 5 is a flow chart of an example process 500 for assessing an impact that a change to an enterprise resource planning (ERP) system would have on custom code used to support one or more ERP tools of the ERP system and performing actions to eliminate or reduce the impact. In some implementations, one or more process blocks of FIG. 5 may be performed by a code assessment platform (e.g., code assessment platform 230). In some implementations, one or more process blocks of FIG. 5 may be performed by another device or a group of devices separate from or including the code assessment platform, such as a user device (e.g., user device 210), a data source (e.g., data source 220), and/or an ERP system (e.g., ERP system 250).

As shown in FIG. 5, process 500 may include receiving, from a user device, a request for a code assessment of a proposed change to an enterprise resource planning (ERP) system of an organization, wherein the code assessment is to identify an impact that implementing the proposed change is to have on custom code associated with the ERP system, wherein the proposed change includes at least one of: a first change to migrate organization data of the organization from a first set of databases to a second set of databases, or a second change to transform the organization data of the organization to a state that is compatible with the second set of databases (block 510). For example, the code assessment platform (e.g., code assessment platform 230, using computing resource 235, processor 320, memory 330, input component 350, communication interface 370, etc.) may receive, from the user device, a request for a code assessment of a proposed change to an ERP system of an organization, as described above in connection with FIGS. 1A-1E. In some implementations, the code assessment may identify an impact that implementing the proposed change is to have on custom code associated with the ERP system. In some implementations, the proposed change may include a first change to migrate organization data of the organization from a first set of databases to a second set of databases, and/or a second change to transform the organization data of the organization to a state that is compatible with the second set of databases.

As further shown in FIG. 5, process 500 may include providing a tool to the ERP system to cause the tool to generate custom code metadata for a set of custom items associated with the custom code and to provide the custom code metadata to a device (e.g., a device of the code assessment platform) or to a data structure accessible to the device, wherein the tool is to generate the custom code metadata by performing a set of error checks to determine whether the set of custom items will cause errors after the proposed change is implemented (block 520). For example, the code assessment platform (e.g., code assessment platform 230, using computing resource 235, processor 320, memory 330, output component 360, communication interface 370, etc.) may provide a tool to the ERP system to cause the tool to generate custom code metadata for a set of custom items associated with the custom code and to provide the custom code metadata to the code assessment platform or to a data structure accessible to the code assessment platform, as described above in connection with FIGS. 1A-1E. In some implementations, the tool may generate the custom code metadata by performing a set of error checks to determine whether the set of custom items will cause errors after the proposed change is implemented.

As further shown in FIG. 5, process 500 may include receiving, from the ERP system or the data structure, the custom code metadata (block 530). For example, the code assessment platform (e.g., code assessment platform 230, using computing resource 235, processor 320, memory 330, input component 350, communication interface 370, etc.)

may receive, from the ERP system (e.g., ERP system 250) or the data structure, the custom code metadata, as described above in connection with FIGS. 1A-1E.

As further shown in FIG. 5, process 500 may include generating assessment data for the code assessment by processing the custom code metadata, wherein the assessment data identifies one or more actions that are capable of being performed to allow the proposed change to be implemented without the errors occurring (block 540). For example, the code assessment platform (e.g., code assessment platform 230, using computing resource 235, processor 320, memory 330, etc.) may generate assessment data for the code assessment by processing the custom code metadata, as described above in connection with FIGS. 1A-1E. In some implementations, the assessment data may identify one or more actions that are capable of being performed to allow the proposed change to be implemented without the errors occurring.

As further shown in FIG. 5, process 500 may include providing the assessment data for the code assessment for display on an interface of the user device (block 550). For example, the code assessment platform (e.g., code assessment platform 230, using computing resource 235, processor 320, memory 330, output component 360, communication interface 370, etc.) may provide the assessment data for the code assessment for display on an interface of the user device, as described above in connection with FIGS. 1A-1E.

As further shown in FIG. 5, process 500 may include performing the one or more actions to permit the proposed change to be implemented without the errors occurring (block 560). For example, the code assessment platform (e.g., code assessment platform 230, using computing resource 235, processor 320, input component 350, memory 330, output component 360, communication interface 370, etc.) may perform the one or more actions to permit the proposed change to be implemented without the errors occurring, as described above in connection with FIGS. 1A-1E.

Process 500 may include additional implementations, such as any single implementation or any combination of implementations described below and/or in connection with one or more other processes described elsewhere herein.

In some implementations, the assessment data may be generated without the code assessment platform accessing organization data of the organization and the custom code used by the ERP system. In some implementations, the proposed change may include the second change. In some implementations, when transforming the organization data to the state that is compatible with the second set of databases, the code assessment platform may remove or simplify a portion of the organization data.

In some implementations, the custom code metadata may include metadata identifying a type of error, metadata identifying a particular custom item, of the set of custom items, that is to cause a particular error, metadata identifying one or more additional custom items, of the set of custom items, that are to be impacted by the particular error, and/or metadata identifying one or more databases, of the second set of databases, that are to be impacted by the particular error.

In some implementations, when generating the assessment data for the code assessment, the code assessment platform may obtain system requirements data associated with a group of devices that are part of the ERP system, and may process the system requirements data to determine that system requirements for a particular device, of the group of devices, does not satisfy minimum system requirements for interacting with the second set of databases. In some implementations, when performing the one or more actions, the code assessment platform may perform a particular action to ensure that the system requirements of the particular device satisfy the minimum system requirements for interacting with the second set of databases.

In some implementations, when performing the one or more actions, the code assessment platform may identify that a particular action, of the one or more actions, is capable of being automated. In some implementations, the particular action may be a first action to modify a custom item of the set of custom items, a second action to remove the custom item, a third action to generate a new custom item, or a fourth action to combine the custom item with another custom item. Additionally, when performing the one or more actions, the code assessment platform may perform the particular action based on identifying that the particular action is capable of being automated, and may provide, to the user device, an indication that the particular action has been performed.

In some implementations, the code assessment platform may generate predictive analytics data by analyzing the assessment data and historical data associated with the organization. In some implementations, the predictive analytics data may indicate a particular impact that implementing the proposed change is to have on a class associated with the organization. The class may include at least one of: a first class for customers of the organization, a second class for employees of the organization, or a third class for a particular group within the organization. Additionally, the code assessment platform may provide the predictive analytics data to one or more devices associated with the organization.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
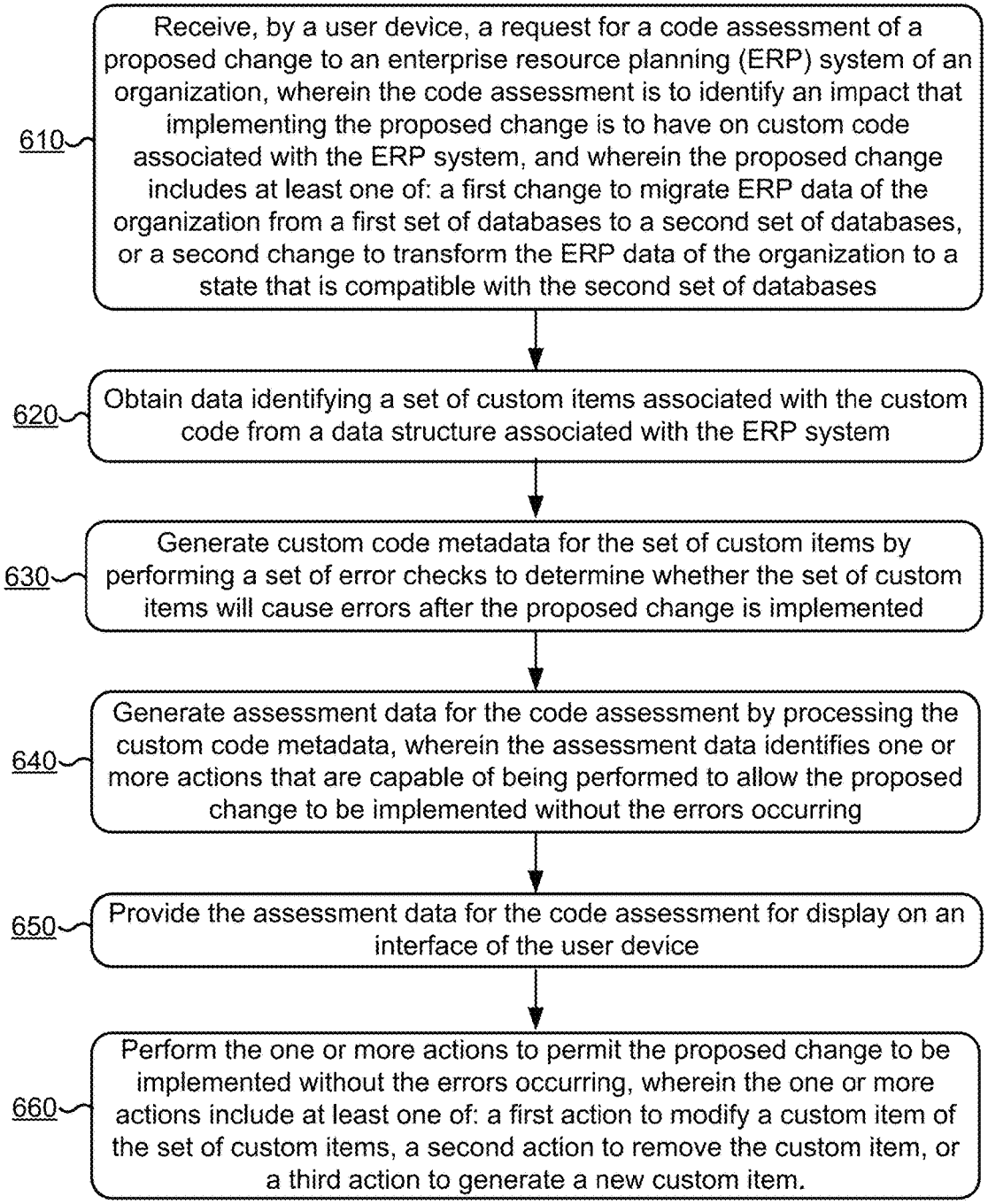

FIG. 6 is a flow chart of an example process 600 for assessing an impact that a change to an enterprise resource planning (ERP) system would have on custom code used to support one or more ERP tools of the ERP system and performing actions to eliminate or reduce the impact. In some implementations, one or more process blocks of FIG. 6 may be performed by a code assessment platform (e.g., code assessment platform 230). In some implementations, one or more process blocks of FIG. 6 may be performed by another device or a group of devices separate from or including the code assessment platform, such as a user device (e.g., user device 210), a data source (e.g., data source 220), and/or an ERP system (e.g., ERP system 250).

As shown in FIG. 6, process 600 may include receiving, from a user device, a request for a code assessment of a proposed change to an enterprise resource planning (ERP) system of an organization, wherein the code assessment is to identify an impact that implementing the proposed change is to have on custom code associated with the ERP system, and wherein the proposed change includes at least one of: a first change to migrate organization data of the organization from a first set of databases to a second set of databases, or a second change to transform the organization data of the organization to a state that is compatible with the second set of databases (block 610). For example, the code assessment platform (e.g., code assessment platform 230, using computing resource 235, processor 320, memory 330, input component 350, communication interface 370, etc.) may receive, from a user device (e.g., user device 210), a request for a code assessment of a proposed change to an ERP system of an organization, as described above in connection with in FIGS. 1A-1E. In some implementations, the code assessment may identify an impact that implementing the proposed change is to have on custom code associated with the ERP system. In some implementations, the proposed change may include a first change to migrate organization data of the organization from a first set of databases to a second set of databases, and/or a second change to transform the organization data of the organization to a state that is compatible with the second set of databases.

As further shown in FIG. 6, process 600 may include obtaining data identifying a set of custom items associated with the custom code from a data structure associated with the ERP system (block 620). For example, the code assessment platform (e.g., code assessment platform 230, using computing resource 235, processor 320, memory 330, input component 350, communication interface 370, etc.) may obtain data identifying a set of custom items associated with the custom code from a data structure associated with the ERP system (e.g., ERP system 250), as described above in connection with FIGS. 1A-1E.

As further shown in FIG. 6, process 600 may include generating custom code metadata for the set of custom items by performing a set of error checks to determine whether the set of custom items will cause errors after the proposed change is implemented (block 630). For example, the code assessment platform (e.g., code assessment platform 230, computing resource 235, using processor 320, memory 330, etc.) may generate custom code metadata for the set of custom items by performing a set of error checks to determine whether the set of custom items will cause errors after the proposed change is implemented, as described above in connection with FIGS. 1A-1E.

As further shown in FIG. 6, process 600 may include generating assessment data for the code assessment by processing the custom code metadata, wherein the assessment data identifies one or more actions that are capable of being performed to allow the proposed change to be implemented without the errors occurring (block 640). For example, the code assessment platform (e.g., code assessment platform 230, using computing resource 235, processor 320, memory 330, etc.) may generate assessment data for the code assessment by processing the custom code metadata, as described above in connection with FIGS. 1A-1E. In some implementations, the assessment data may identify one or more actions that are capable of being performed to allow the proposed change to be implemented without the errors occurring.

As further shown in FIG. 6, process 600 may include providing the assessment data for the code assessment for display on an interface of the user device (block 650). For example, the code assessment platform (e.g., code assessment platform 230, using computing resource 235, processor 320, memory 330, output component 360, communication interface 370, etc.) may provide the assessment data for the code assessment for display on an interface of the user device, as described above in connection with FIGS. 1A-1E.

As further shown in FIG. 6, process 600 may include performing the one or more actions to permit the proposed change to be implemented without the errors occurring, wherein the one or more actions include at least one of: a first action to modify a custom item of the set of custom items, a second action to remove the custom item, or a third action to generate a new custom item (block 660). For example, the code assessment platform (e.g., code assessment platform 230, using computing resource 235, processor 320, memory 330, input component 350, output component 360, communication interface 370, etc.) may perform the one or more actions to permit the proposed change to be implemented without the errors occurring, as described above in connection with FIGS. 1A-1E. In some implementations, the one or more actions may include a first action to modify a custom item of the set of custom items, a second action to remove the custom item, and/or a third action to generate a new custom item.

Process 600 may include additional implementations, such as any single implementation or any combination of implementations described below and/or in connection with one or more other processes described elsewhere herein.

In some implementations, the proposed change may include the second change. In some implementations, when transforming the organization data to the state that is compatible with the second set of databases, the code assessment platform may remove or simplify a portion of the organization data.

In some implementations, when generating the custom code metadata, the code assessment platform may execute an error reporting tool that is able to generate the custom code metadata by scanning the ERP system to identify the set of custom items and performing the set of error checks to determine whether the set of custom items will cause errors after the proposed change is implemented. In some implementations, the set of error checks may be performed without the one or more processors needing to access organization data of the organization and the custom code used by the ERP system.

In some implementations, when generating the assessment data, the code assessment platform may provide the custom code metadata as input to a data model that has been trained on historical assessment data to cause the data model to output a set of values indicating likelihoods of particular actions correcting particular errors. In some implementations, the code assessment platform may determine that a value, of the set of values, satisfies a threshold confidence level. In some implementations, the code assessment platform may generate, as part of the assessment data, data identifying a particular action that is associated with the value.

In some implementations, the code assessment platform may generate, as part of the assessment data, instructions indicating how to implement an automated solution to a particular error. In some implementations, the automated solution may be to modify a particular custom item of the set of custom items. In some implementations, when performing the one or more actions, the code assessment platform may provide a device associated with the ERP system with the instructions indicating how to modify the particular custom item to allow the proposed change to be implemented without the particular custom item causing a runtime error during execution.

In some implementations, the code assessment platform may compare the assessment data and additional assessment data associated with one or more other organizations that have previously implemented the proposed change and may generate a report indicating a degree of complexity of the custom code of the organization relative to the one or more other organizations. In some implementations, the degree of complexity may be based on a number of errors associated with the custom code relative to a number of errors associated with additional custom code of the one or more other organizations, or an estimated time to correct the errors associated with the custom code relative to an actual time taken to correct the errors associated with the additional custom code. Additionally, the code assessment platform may provide the report for display on the interface of the user device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, the code assessment platform generates a code assessment that identifies errors and recommends actions that may be performed to ensure that the custom code is compatible with the new databases. Additionally, by providing the organization with a code assessment, the code assessment platform allows the proposed change to be implemented using an efficient and effective use of processing resources and/or network resources. For example, by identifying particular custom code that need to be modified, added, and/or removed, and by identifying an estimated time to modify, add, and/or remove the particular custom code, the organization is able to allocate a sufficient amount of resources (e.g., processing resources, network resources, human resources, etc.) needed to implement the proposed change.

Furthermore, by automatically performing actions to ensure that the custom code is compatible with the new set of databases, the code assessment platform conserves processing resources and/or network resources that would otherwise be used to manually correct errors caused by the custom code, processing resources and/or network resources that would be used to execute error correction techniques if the manually corrections did not succeed, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, operatively connected to the one or more memories, to:
   receive, from a user device, a request for a code assessment of a proposed change to an enterprise resource planning (ERP) system of an organization,
      wherein the code assessment is to identify an impact that implementing the proposed change is to have on custom code associated with the ERP system, and
      wherein the proposed change includes at least one of:
         a first change to migrate organization data of the organization from a first set of databases to a second set of databases, or
         a second change to transform the organization data of the organization to a state that is compatible with the second set of databases;
   obtain data identifying a set of custom items associated with the custom code from a data structure associated with the ERP system;
   generate custom code metadata for the set of custom items by performing a set of error checks to determine whether the set of custom items will cause errors after the proposed change is implemented;
   generate an assessment report for the code assessment by processing the custom code metadata,
      wherein the assessment report includes assessment data, and
      wherein the assessment data includes at least one of:
         a first set of assessment data identifying one or more actions that are capable of being performed to allow the proposed change to be implemented without the errors occurring, or
         a second set of assessment data identifying an estimated time to implement the proposed change without the errors occurring;
   provide the assessment report for the code assessment for display on an interface of the user device; and
   perform the one or more actions to permit the proposed change to be implemented without the errors occurring.

2. The device of claim 1, wherein the proposed change includes the second change; wherein the second set of databases utilize in-memory storage capabilities; and wherein transforming the organization data to the state that is compatible with the second set of databases includes removing or simplifying a portion of the organization data.

3. The device of claim 1, wherein the custom code metadata includes at least one of:
    metadata identifying a syntax error,
    metadata identifying a functional error,
    metadata identifying a performance error,
    metadata identifying a simplification error, or
    metadata identifying an optimization error.
4. The device of claim 1, wherein the one or more processors are further to:
    obtain system requirements data associated with a group of devices that are part of the ERP system;
    process the system requirements data to determine that system requirements for a particular device, of the group of devices, does not satisfy minimum system requirements for interacting with the second set of databases; and
    wherein the one or more processors, when performing the one or more actions, are to:
        perform a particular action to ensure that the system requirements of the particular device satisfies the minimum system requirements for interacting with the second set of databases.
5. The device of claim 1, wherein the set of error checks includes at least one of:
    a first error check identifying a first custom item, of the set of custom items, that interacts with a database, of the first set of databases, that is not utilized by the second set of databases,
    a second error check identifying a second custom item, of the set of custom items, that includes syntax that is not compatible with the second set of databases, or
    a third error check identifying a third custom item for interacting with the second set of databases but that is not included in the set of custom items.
6. The device of claim 1, wherein the one or more processors, when generating the assessment report, are to:
    provide the custom code metadata as input to a data model that has been trained on historical assessment data to cause the data model to output a set of values indicating likelihoods of particular actions correcting particular errors,
    determine that a value, of the set of values, satisfies a threshold confidence level, and
    generate, as part of the first set of assessment data of the assessment report, data identifying a particular action that is associated with the value.
7. The device of claim 1, wherein the one or more processors are further to:
    generate, as part of the first set of assessment data, data identifying an automated solution to a particular error, wherein the automated solution is to modify a custom item of the set of custom items; and
    wherein the one or more processors, when performing the one or more actions, are to:
        modify the custom item to allow the proposed change to be implemented without the custom item causing an error during execution.
8. A method, comprising:
    receiving, by a device and from a user device, a request for a code assessment of a proposed change to an enterprise resource planning (ERP) system of an organization,
        wherein the code assessment is to identify an impact that implementing the proposed change is to have on custom code associated with the ERP system,
        wherein the proposed change includes at least one of:
            a first change to migrate organization data of the organization from a first set of databases to a second set of databases, or
            a second change to transform the organization data of the organization to a state that is compatible with the second set of databases;
    providing, by the device, a tool to the ERP system to cause the tool to generate custom code metadata for a set of custom items associated with the custom code and to provide the custom code metadata to the device or to a data structure accessible to the device,
        wherein the tool is to generate the custom code metadata by performing a set of error checks to determine whether the set of custom items will cause errors after the proposed change is implemented;
    receiving, by the device and from the ERP system or the data structure, the custom code metadata;
    generating, by the device, assessment data for the code assessment by processing the custom code metadata,
        wherein the assessment data identifies one or more actions that are capable of being performed to allow the proposed change to be implemented without the errors occurring;
    providing, by the device, the assessment data for the code assessment for display on an interface of the user device; and
    performing, by the device, the one or more actions to permit the proposed change to be implemented without the errors occurring.
9. The method of claim 8, wherein the assessment data is generated without the device accessing organization data of the organization and the custom code used by the ERP system.
10. The method of claim 8, wherein the proposed change includes the second change; and wherein transforming the organization data to the state that is compatible with the second set of databases includes removing or simplifying a portion of the organization data.
11. The method of claim 8, wherein the custom code metadata includes at least one of:
    metadata identifying a type of error,
    metadata identifying a particular custom item, of the set of custom items, that is to cause a particular error,
    metadata identifying one or more additional custom items, of the set of custom items, that are to be impacted by the particular error, or
    metadata identifying one or more databases, of the second set of databases, that are to be impacted by the particular error.
12. The method of claim 8, wherein generating the assessment data for the code assessment comprises:
    obtaining system requirements data associated with a group of devices that are part of the ERP system;
    processing the system requirements data to determine that system requirements for a particular device, of the group of devices, does not satisfy minimum system requirements for interacting with the second set of databases; and
    wherein performing the one or more actions comprises:
        performing a particular action to ensure that the system requirements of the particular device satisfies the minimum system requirements for interacting with the second set of databases.
13. The method of claim 8, wherein performing the one or more actions comprises:
    identifying that a particular action, of the one or more actions, is capable of being automated, wherein the particular action is:
    a first action to modify a custom item of the set of custom items,
    a second action to remove the custom item,
    a third action to generate a new custom item, or
    a fourth action to combine the custom item with another custom item,
performing the particular action based on identifying that the particular action is capable of being automated, and
providing, to the user device, an indication that the particular action has been performed.

14. The method of claim 8, further comprising:
generating predictive analytics data by analyzing the assessment data and historical data associated with the organization,
    wherein the predictive analytics data indicates a particular impact that implementing the proposed change is to have on a class associated with the organization,
        wherein the class includes:
            a first class for customers of the organization,
            a second class for employees of the organization, or
            a third class for a particular group within the organization; and
providing the predictive analytics data to one or more devices associated with the organization.

15. A non-transitory computer-readable medium storing instructions, the instructions comprising:
one or more instructions that, when executed by one or more processors, cause the one or more processors to:
    receive, from a user device, a request for a code assessment of a proposed change to an enterprise resource planning (ERP) system of an organization,
        wherein the code assessment is to identify an impact that implementing the proposed change is to have on custom code associated with the ERP system, and
        wherein the proposed change includes at least one of:
            a first change to migrate organization data of the organization from a first set of databases to a second set of databases, or
            a second change to transform the organization data of the organization to a state that is compatible with the second set of databases;
    obtain data identifying a set of custom items associated with the custom code from a data structure associated with the ERP system;
    generate custom code metadata for the set of custom items by performing a set of error checks to determine whether the set of custom items will cause errors after the proposed change is implemented;
    generate assessment data for the code assessment by processing the custom code metadata,
        wherein the assessment data identifies one or more actions that are capable of being performed to allow the proposed change to be implemented without the errors occurring;
    provide the assessment data for the code assessment for display on an interface of the user device; and
    perform the one or more actions to permit the proposed change to be implemented without the errors occurring,
        wherein the one or more actions include at least one of:
            a first action to modify a custom item of the set of custom items,
            a second action to remove the custom item, or
            a third action to generate a new custom item.

16. The non-transitory computer-readable medium of claim 15, wherein the proposed change includes the second change; and wherein transforming the organization data to the state that is compatible with the second set of databases includes removing or simplifying a portion of the organization data.

17. The non-transitory computer-readable medium of claim 15, wherein the one or more instructions, that cause the one or more processors to generate the custom code metadata, cause the one or more processors to:
    execute an error reporting tool that is able to generate the custom code metadata by scanning the ERP system to identify the set of custom items and performing the set of error checks to determine whether the set of custom items will cause errors after the proposed change is implemented,
        wherein the set of error checks are performed without the one or more processors needing to access organization data of the organization and the custom code used by the ERP system.

18. The non-transitory computer-readable medium of claim 15, wherein the one or more instructions, that cause the one or more processors to generate the assessment data, cause the one or more processors to:
    provide the custom code metadata as input to a data model that has been trained on historical assessment data to cause the data model to output a set of values indicating likelihoods of particular actions correcting particular errors,
    determine that a value, of the set of values, satisfies a threshold confidence level, and
    generate, as part of the assessment data, data identifying a particular action that is associated with the value.

19. The non-transitory computer-readable medium of claim 15, wherein the one or more instructions, when executed by the one or more processors, further cause the one or more processors to:
    generate, as part of the assessment data, instructions indicating how to implement an automated solution to a particular error,
        wherein the automated solution is to modify a particular custom item of the set of custom items; and
    wherein the one or more processors, when performing the one or more actions, are to:
    provide a device associated with the ERP system with the instructions indicating how to modify the particular custom item to allow the proposed change to be implemented without the particular custom item causing a run-time error during execution.

20. The non-transitory computer-readable medium of claim 15, wherein the one or more instructions, when executed by the one or more processors, further cause the one or more processors to:
    compare the assessment data and additional assessment data associated with one or more other organizations that have previously implemented the proposed change;
    generate a report indicating a degree of complexity of the custom code of the organization relative to the one or more other organizations,
        wherein the degree of complexity is based on at least one of:

a number of errors associated with the custom code relative to a number of errors associated with additional custom code of the one or more other organizations, or an estimated time to correct the errors associated with the custom code relative to an actual time taken to correct the errors associated with the additional custom code; and provide the report for display on the interface of the user device.

* * * * *